(12) United States Patent
Sakai et al.

(10) Patent No.: US 7,454,340 B2
(45) Date of Patent: Nov. 18, 2008

(54) VOICE RECOGNITION PERFORMANCE ESTIMATION APPARATUS, METHOD AND PROGRAM ALLOWING INSERTION OF AN UNNECESSARY WORD

(75) Inventors: Masaru Sakai, Kawasaki (JP); Hiroshi Kanazawa, Ebina (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 873 days.

(21) Appl. No.: 10/931,998

(22) Filed: Sep. 2, 2004

(65) Prior Publication Data

US 2005/0086055 A1  Apr. 21, 2005

(30) Foreign Application Priority Data

Sep. 4, 2003  (JP)  ............... 2003-312747

(51) Int. Cl.
*G10L 15/00* (2006.01)
*G10L 13/00* (2006.01)
(52) U.S. Cl. ............... 704/251; 704/231; 704/258; 704/260
(58) Field of Classification Search ............... None
See application file for complete search history.

(56) References Cited

U.S. PATENT DOCUMENTS

| 5,890,117 | A * | 3/1999 | Silverman ............ 704/260 |
| 6,622,121 | B1 * | 9/2003 | Crepy et al. ............ 704/243 |
| 2003/0139830 | A1 * | 7/2003 | Tsuji et al. ............ 700/94 |
| 2005/0049868 | A1 * | 3/2005 | Busayapongchai ............ 704/251 |

OTHER PUBLICATIONS

Takebayashi, Y. Kanazawa, H. "Adaptive noise immunity learning for word spotting" Proceedings of IEEE International Conference on Acoustics, Speech and Signal Processing, 1994, vol. 1 p. 449-52.*
Kazumasa Yamamoto, et al., "Aurora-2J/Aurora-3J Corpus and Evaluation Baseline", IPSJ SIG Technical Report, Jul. 19, 2003, pp. 101-106 (with English abstract).
Satoshi Uchida, et al. "Recognition of Natural Dialog Voice That Uses Voice Recognition Engine Julius", The Acoustical Society of Japan, Oct. 2, 2001, pp. 75-76.
Ryuta Terashima, et al., "An Evaluation Method of ASR Performance by HMM-Based Speech Synthesis", Proc. of the Spring Meeting of the Acoustic Society of Japan, Mar. 2003, pp. 159-160.

(Continued)

*Primary Examiner*—David R. Hudspeth
*Assistant Examiner*—Matthew J. Sked
(74) *Attorney, Agent, or Firm*—Oblon, Spivak, McClelland, Maier & Neustadt, P.C.

(57) ABSTRACT

A voice recognition estimating apparatus for a voice recognition apparatus, including a voice data property generator that generates properties of voice data used to determine, based on an estimation item, a feature of synthetic voice data. The estimation item is used to estimate a performance of the voice recognition apparatus. The voice data property generator includes an acquisition unit that acquires vocabulary data and unnecessary word data as the estimation item. The unnecessary word data indicates an unnecessary word inserted in the vocabulary data and an insertion position of the unnecessary word. The voice data property generator also includes a generator that generates the properties of the voice data. The properties of the voice data include selected voice quality data items, the vocabulary data and the unnecessary word data.

6 Claims, 14 Drawing Sheets

OTHER PUBLICATIONS

T. Matsui, et al., "Large-Scale Japanese Voice Database in Light of Wide Range of Districts and Ages", Lecture Article Papers of the Acoustical Society of Japan, Published Autumn 1999, pp. 169-170.

Furui, "Voice Data Processing", Published by Morikita Publishers Co., Ltd., pp. 16-39.

* cited by examiner

FIG. 4A

| Estimation item | Variation |
|---|---|
| Speaker (Sex) | Man A |
| | Man B |
| | Man C |
| | Woman D |
| | Woman E |
| | Woman F |

FIG. 4B

| Estimation item | Variation |
|---|---|
| Speech Speed | Fastest |
| | Faster |
| | Average |
| | Slower |
| | Slowest |

FIG. 4C

| Estimation item | Variation |
|---|---|
| Voice Tone | Highest |
| | Higher |
| | Average |
| | Lower |
| | Lowest |

FIG. 4D

| Estimation item | Variation |
|---|---|
| Intonation | Wide range of changes |
| | Average |
| | Narrow range of changes (flat) |

| Estimation item | Variation | Voice synthesis parameter : Model |
|---|---|---|
| Speaker (Sex) | Man A | Model A |
| | Man B | Model B |
| | Man C | Model C |
| | Woman D | Model D |
| | Woman E | Model E |
| | Woman F | Model F |

FIG. 5A

| Estimation item | Variation | Voice synthesis parameter : Duration |
|---|---|---|
| Speech Speed | Fastest | 0.50 |
| | Faster | 0.75 |
| | Average | 1.00 |
| | Slower | 1.50 |
| | Slowest | 2.00 |

FIG. 5B

| Estimation item | Variation | Voice synthesis parameter : Pitch |
|---|---|---|
| Voice Tone | Highest | 2.00 |
| | Higher | 1.50 |
| | Average | 1.00 |
| | Lower | 0.75 |
| | Lowest | 0.50 |

FIG. 5C

| Estimation item | Variation | Voice synthesis parameter : Intonation Pattern |
|---|---|---|
| Intonation | Average | Average Intonation Pattern |

FIG. 5D

| Estimation item | Variation | Recognition Ratio (%) | |
|---|---|---|---|
| Speaker (Sex) | Man A | 75.00 | |
| | Man B | 80.00 | |
| | Man C | 50.00 | |
| | Woman D | 80.00 | |
| | Woman E | 90.00 | |
| | Woman F | 75.00 | |
| | | 75.00 | Average |
| | | 150.00 | Dispersion |

| Estimation item | Variation | Recognition Ratio (%) | |
|---|---|---|---|
| Speech Speed | Fastest | 50.00 | |
| | Faster | 70.00 | |
| | Average | 80.00 | |
| | Slower | 85.00 | |
| | Slowest | 90.00 | |
| | | 75.00 | Average |
| | | 200.00 | Dispersion |

| Estimation item | Variation | Recognition Ratio (%) | |
|---|---|---|---|
| Voice Tone | Highest | 75.00 | |
| | Higher | 75.00 | |
| | Average | 75.00 | |
| | Lower | 75.00 | |
| | Lowest | 75.00 | |
| | | 75.00 | Average |
| | | 0.00 | Dispersion |

FIG. 6

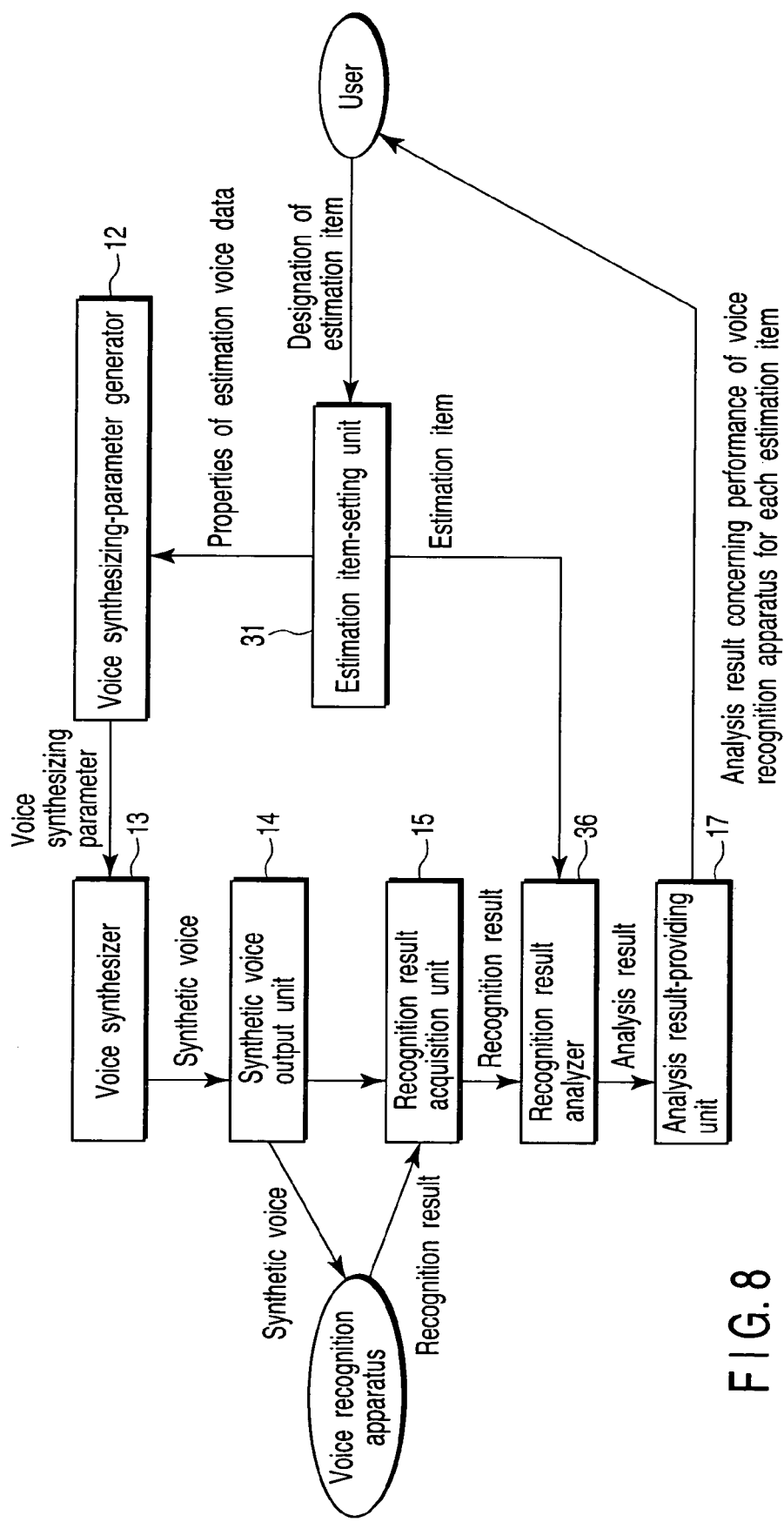
F I G. 8

FIG. 10

| Correctness | Recognition result (erroneous recognition) | Number of occasions of erroneous recognition / total occasions of utterance |
|---|---|---|
| Power-on | Power-off | 0/100 |
| Power-off | Power-on | 30/100 |

| Correctness | Recognition result (erroneous recognition) | Number of occasions of erroneous recognition / total occasions of utterance |
|---|---|---|
| Turn-on power | Turn-off power | 15/100 |
| Turn-off power | Turn-on power | 15/100 |

FIG. 13

| | Recognition rate (%) |
|---|---|
| No unnecessary word | 90.00 |
| Unnecessary word inserted | 50.00 |

FIG. 16

| Emotion | Recognition rate (%) |
|---|---|
| Anger | 80.00 |
| Pleasure | 90.00 |
| Sorrow | 50.00 |

VOICE RECOGNITION PERFORMANCE ESTIMATION APPARATUS, METHOD AND PROGRAM ALLOWING INSERTION OF AN UNNECESSARY WORD

CROSS-REFERENCE TO RELATED APPLICATIONS

This application is based upon and claims the benefit of priority from prior Japanese Patent Application No. 2003-312747, filed Sep. 4, 2003, the entire contents of which are incorporated herein by reference.

BACKGROUND OF THE INVENTION

1. Field of the Invention

The present invention relates to an apparatus, method and program for estimating the performance of a voice recognition apparatus.

2. Description of the Related Art

To develop a voice recognition apparatus, it is necessary to estimate whether the apparatus can exhibit performance as expected. The performance of the voice recognition apparatus is estimated by inputting thereto voice data recorded under various conditions, and analyzing the recognition results of the voice data. For instance, if the recognition rate of the apparatus is analyzed, the conditions under which the apparatus can exhibit good performance are detected, and the performance under such conditions can also be acquired as a numerical value, such as a recognition rate (see, for example, Proc. of the spring meeting of the acoustic society of Japan, published March 2003, pp. 159-160, "An Evaluation Method of ASR Performance by HMM-based Speech Synthesis" by R. Terashima et al.). Furthermore, if the voice recognition apparatus does not exhibit expected performance, its causes can be detected in detail by analyzing the features of the erroneous recognition results, and can be utilized to improve the performance.

Various items can be utilized for estimating the performance of voice recognition apparatuses. The following three items are typical ones: (1) Variations in vocabulary sets that can be detected by the voice recognition apparatus; (2) variations due to speakers (the sex of a speaker, the speed of speech, voice tone, intonation, accent, etc.); and (3) variations due to the environment (noise, the characteristics of a microphone, the characteristics of a voice transmission system, etc.). Concerning each estimation item, a number of voices obtained under various conditions are input to the voice recognition apparatus to determine whether the apparatus exhibits good performance for each variation of each item. If the voice recognition apparatus exhibits good performance for any variation, i.e., if it shows a small range of differences in performance under various conditions, it is determined to be an ideal voice recognition apparatus.

To estimate the performance of the voice recognition apparatus, the apparatus is analyzed for various points of view concerning the above-mentioned estimation items. The following two points of view are typical ones: (1) General performance of the voice recognition apparatus concerning various items is checked (see, for example, Lecture Article Papers of the Acoustical Society of Japan, published Autumn 1999, pp. 169-170, "Large-Scale Japanese Voice Database in Light of Wide Range of Districts and Ages", written by Matsui, Naito, et al.). To estimate the basic performance of the voice recognition apparatus, it is necessary to estimate the performance of the apparatus concerning all items. (2) The performance of the voice recognition apparatus under a particular condition is checked. To estimate the performance of a voice recognition apparatus for a particular purpose, the performance of the apparatus is checked concerning variations in the items other than the items that do not have variations, i.e., the items that can be fixed in estimation. Specifically, to estimate the performance of a voice recognition apparatus "whose detectable vocabulary sets are fixed" and "which is dedicated to men only", the performance of the apparatus is estimated concerning variations in the items other than the above items, with the vocabulary sets and the sex of the speakers fixed. In general, the to-be-estimated items depend upon the purpose of each voice recognition apparatus.

The following methods can be used to estimate the performance of voice recognition apparatuses in the above-mentioned points of view.

(1) To check the general performance of a voice recognition apparatus concerning various items, it is necessary to prepare a large number of sets of voice data for estimation that sufficiently cover the variations of all items. After checking variations of the estimation voice data sets in units of estimation items, the recognition performance of the apparatus for each variation is determined by, for instance, a statistical method from the recognition results of the apparatus concerning the checked variations. As a result, the performance concerning all variations can be determined.

(2) To check the performance of the voice recognition apparatus under a particular condition, it is needed to collect or newly record estimation voice data sets that cover variations in each of estimation items to be considered under the particular condition. In particular, when the design of the voice recognition apparatus concerning detectable vocabulary sets is changed, voice data corresponding to the changed vocabulary sets must be newly recorded. The performance of the voice recognition apparatus under a particular condition can be determined concerning each estimation item by checking variations in estimation data set for each item, and determining the recognition performance of the apparatus concerning each variation by, for example, a statistical method.

As stated above, to estimate the performance of a voice recognition apparatus, it is necessary to prepare sets of voice data for estimation corresponding to an estimation point of view. However, considerable time and expense are required to record a large amount of voice data used as estimation voice data sets.

In the case (1) where general performance of a voice recognition apparatus concerning various estimation items is determined, it is expensive to prepare a large number of sets of estimation voice data that cover variations in all estimation items. Even if such data sets could be prepared, new or additional recording of estimation voice data will be needed when estimation of items, which were not expected at the time or the above-mentioned preparation, has become necessary, or when the number of variations in a certain item needs to be increased. In such cases, further time and expense are entailed.

On the other hand, in the case (2) where the performance of a voice recognition apparatus under a certain condition is checked, if estimation voice data sets do not exist which cover variations in an estimation item to be considered under a particular condition, it is necessary to newly record voice data. This entails considerable time and expense. Thus, to estimate the performance of a voice recognition apparatus, considerable time and expense are involved in preparing voice data for estimation.

It is possible to artificially change already existing estimation voice data sets to cover various estimation items. For instance, concerning estimation items related to the environment (such as noise and microphone characteristics), variations can be added relatively easily by superimposing noise or combining the microphone characteristics and estimation voice data. However, it is very difficult to artificially change the speed of speaking or the tone of already existing voice data. It is almost impossible to modify already existing voice data to change the sex of the speaker of the voice data or the contents of the voice data. Therefore, the above-mentioned problem cannot be solved by the method of artificially changing already existing estimation voice data sets.

BRIEF SUMMARY OF THE INVENTION

The present invention has been developed in light of the above, and aims to provide a voice recognition estimating apparatus, method and program which do not require preparation of voice data for estimation, whose performance for each estimation item can be easily estimated, and which do not require much time and expense for voice data estimation.

According to a first aspect of the invention, there is provided a voice recognition estimating apparatus for a voice recognition apparatus, comprising: a voice data generator which generates properties of estimation voice data used to determine, based on an estimation item, a feature of synthetic voice data, the estimation item being used to estimate performance of the voice recognition apparatus; a parameter generator which generates a parameter used to generate the synthetic voice data as estimation voice data corresponding to the properties of estimation voice data; a synthetic voice generator which generates the synthetic voice data based on the parameter; an output unit configured to output the synthetic voice data to the voice recognition apparatus; an acquisition unit configured to acquire a recognition result from the voice recognition apparatus, the recognition result being obtained when the voice recognition apparatus recognizes the synthetic voice data; and an estimation unit configured to estimate the performance of the voice recognition apparatus with reference to the estimation item and the recognition result.

According to a second aspect of the invention, there is provided a voice recognition estimating apparatus for a voice recognition apparatus, comprising: a voice data generator which generates properties of estimation voice data used to determine, based on an estimation item, a feature of characteristic vector time-series data, the estimation item being used to estimate performance of the voice recognition apparatus; a parameter generator which generates a parameter used to generate characteristic vector time-series data as estimation voice data corresponding to the properties of estimation voice data; a time-series data generator which generates the characteristic vector time-series data based on the parameter; an output unit configured to output the characteristic vector time-series data to the voice recognition apparatus; an acquisition unit configured to acquire a recognition result from the voice recognition apparatus, the recognition result being obtained when the voice recognition apparatus recognizes the characteristic vector time-series data; and an estimation unit configured to estimate the performance of the voice recognition apparatus with reference to the estimation item and the recognition result.

According to a third aspect of the invention, there is provided a voice recognition estimating method comprising: generating properties of estimation voice data used to determine, based on an estimation item, a feature of synthetic voice data, the estimation item being used to estimate performance of a voice recognition apparatus; generating a parameter used to generate the synthetic voice data as estimation voice data corresponding to the properties of estimation voice data; generating the synthetic voice data based on the parameter; outputting the synthetic voice data to the voice recognition apparatus; acquiring a recognition result from the voice recognition apparatus, the recognition result being obtained when the voice recognition apparatus recognizes the synthetic voice data; and estimating performance of the voice recognition apparatus with reference to the estimation item and the recognition result.

According to a forth aspect of the invention, there is provided a voice recognition estimating method comprising: generating properties of estimation voice data used to determine, based on an estimation item, a feature of characteristic vector time-series data, the estimation item being used to estimate performance of a voice recognition apparatus; generating a parameter used to generate characteristic vector time-series data as estimation voice data corresponding to the properties of estimation voice data; generating the characteristic vector time-series data based on the parameter; outputting the characteristic vector time-series data to the voice recognition apparatus; acquiring a recognition result from the voice recognition apparatus, the recognition result being obtained when the voice recognition apparatus recognizes the characteristic vector time-series data; and estimating the performance of the voice recognition apparatus with reference to the estimation item and the recognition result.

According to a fifth aspect of the invention, there is provided a voice recognition estimating program stored in a computer readable medium, comprising: means for instructing a computer to generate properties of estimation voice data used to determine, based on an estimation item, a feature of synthetic voice data, the estimation item being used to estimate performance of the voice recognition apparatus; means for instructing the computer to generate a parameter used to generate the synthetic voice data as estimation voice data corresponding to the properties of estimation voice data; means for instructing the computer to generate the synthetic voice data based on the parameter; means for instructing the computer to output the synthetic voice data to the voice recognition apparatus; means for instructing the computer to acquire a recognition result from the voice recognition apparatus, the recognition result being obtained when the voice recognition apparatus recognizes the synthetic voice data; and means for instructing the computer to estimate the performance of the voice recognition apparatus with reference to the estimation item and the recognition result.

According to a sixth aspect of the invention, there is provided a voice recognition estimating program stored in a computer readable medium, comprising: means for instructing a computer to generate properties of estimation voice data used to determine, based on an estimation item, a feature of characteristic vector time-series data, the estimation item being used to estimate performance of a voice recognition apparatus; means for instructing the computer to generate a parameter used to generate characteristic vector time-series data as estimation voice data corresponding to the properties of estimation voice data; means for instructing the computer to generate the characteristic vector time-series data based on the parameter; means for instructing the computer to output the characteristic vector time-series data to the voice recognition apparatus; means for instructing the computer to acquire a recognition result from the voice recognition apparatus, the recognition result being obtained when the voice recognition apparatus recognizes the characteristic vector time-series data; and means for instructing the computer to estimate the performance of the voice recognition apparatus with reference to the estimation item and the recognition result.

BRIEF DESCRIPTION OF THE SEVERAL VIEWS OF THE DRAWING

FIGS. 4A, 4B, 4C and 4D are views illustrating information stored in the voice quality estimation item variation shown in FIG. 3;

FIGS. 5A, 5B, 5C and 5D are views illustrating voice synthesizing parameters generated by the voice synthesizing-parameter generator, shown in FIG. 1, in units of variations shown in FIGS. 4A, 4B, 4C and 4D;

FIG. 6 is a view illustrating analysis results obtained by the recognition result-analyzing unit using the parameters shown in FIGS. 5A, 5B, 5C and 5D;

FIG. 8 is a block diagram illustrating a voice recognition apparatus according to a third embodiment of the invention;

FIG. 10 is a view illustrating analysis results provided to a user by the analysis result-providing unit shown in FIG. 8;

FIG. 13 is a view illustrating analysis results provided to a user by the analysis result-providing unit shown in FIG. 11;

FIG. 16 is a view illustrating analysis results provided to a user by the analysis result-providing unit shown in FIG. 14.

DETAILED DESCRIPTION OF THE INVENTION

Voice recognition estimating apparatuses, methods and programs according to embodiments of the invention will be described with reference to the accompanying drawings. The apparatuses of the embodiments estimate the performance of a voice recognition apparatus using synthetic voice data output from a voice-synthesizing unit. Assume that the voice-synthesizing unit satisfies the following conditions. This unit adjusts parameters to output synthetic voice data that covers variations in optional vocabulary sets and variations in estimation items caused by different speakers. Using, as voice data sets for estimation, the synthetic voice data output from the voice-synthesizing unit, the estimating apparatus can estimate the performance of the voice recognition apparatus concerning each estimation item. The embodiments of the invention will be described in more detail.

First Embodiment

Figure 1:
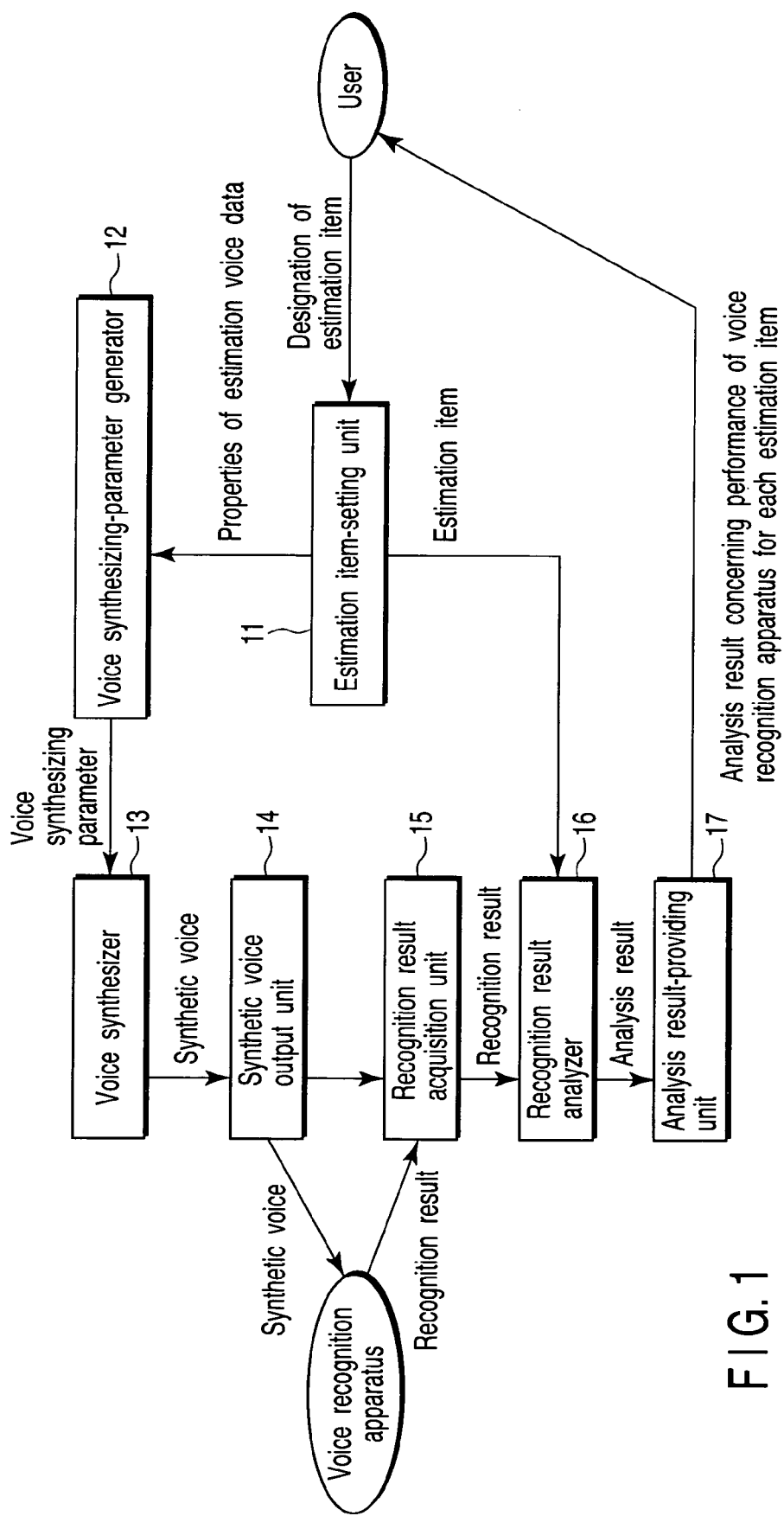
FIG. 1 is a block diagram illustrating a voice recognition apparatus according to a first embodiment of the invention.

Referring to FIG. 1, each unit of a voice recognition estimating apparatus according to a first embodiment will be described. FIG. 1 is a block diagram illustrating this estimating apparatus.

An estimation item-setting unit 11 permits a user to designate an estimation item for a voice recognition apparatus. Estimation items are used to determine whether the voice recognition apparatus can discriminate different types of voice input thereto. The estimation items include, for example, voice quality data, vocabulary data, data indicating whether or not a hesitation pause, hesitation voice or unnecessary word is inserted, and data indicating the emotion with which a voice is charged. The voice quality data includes, for example, the sex of a speaker, the speed of speech, voice tone and intonation. In the first embodiment, three estimation items—the sex of a speaker, the speed of speech and the tone of voice—are used as properties of estimation voice data. Vocabulary data will be described in a third embodiment. Information indicating whether or not a hesitation pause, hesitation voice or unnecessary word is inserted will be described in a fourth embodiment. Further, information indicating the emotion with which a voice is charged will be described in a fifth embodiment. However, the estimation items are not limited to the above, but other items may be used.

A voice synthesizing-parameter generator 12 generates a voice synthesizing parameter corresponding to the variations of each estimation item designated by the estimation item-setting unit 11. The voice synthesizing parameter is used to generate synthetic voice data corresponding to the variations of each estimation item, and has values set for respective variations. Generation of voice synthesizing parameters will be described later in detail with reference to FIGS. 5A, 5B, 5C and 5D.

A voice synthesizer 13 synthesizes voice data based on voice synthesizing parameters output from the voice synthesizing-parameter generator 12. This process synthesizes, in units of arbitrary combinations of the set values of the input voice synthesizing parameter, voices that are to be issued to read all words contained in a standard vocabulary set (indicated by reference numeral 113 in FIG. 3 and described later) prestored in the estimation item-setting unit 11. After that, the voice synthesizer 13 outputs the resultant synthetic voice data to a synthetic voice output unit 14.

The synthetic voice output unit 14 supplies a to-be-estimated voice recognition apparatus with the synthetic voice data generated by the voice synthesizer 13. The voice recognition apparatus performs a recognition process on the input synthetic voice data. A recognition result acquisition unit 15 acquires the recognition result from the voice recognition apparatus, and outputs it to a recognition result analyzer 16.

The recognition result analyzer 16 receives each recognition result of the voice recognition apparatus supplied from the recognition result acquisition unit 15, and an estimation item output from the estimation item-setting unit 11, thereby analyzing the performance of the voice recognition apparatus concerning the estimation item designated by the estimation item-setting unit 11. The recognition result analyzer 16 determines whether each input recognition result is correct, and sequentially stores the determination results. At this time, the estimation item corresponding to the determination results, and information on the variations of the estimation item are stored together with the determination results. The recognition result analyzer 16 analyzes, using a totalistic method, the performance of the voice recognition apparatus concerning the estimation item designated by the estimation item-setting unit 11, after the voice synthesizer 13 has finished the output of all synthetic voice data items corresponding to the voice synthesizing-parameter set from the voice synthesizing-parameter generator 12, thereby obtaining all recognition results. The recognition result analyzer 16 outputs the analysis result to an analysis result-providing unit 17.

The analysis result-providing unit 17 provides a user with the analysis result output from the recognition result analyzer 16. The analysis result-providing unit 17 provides the input analysis result in a form that enables the user to easily understand the result.

Figure 2:
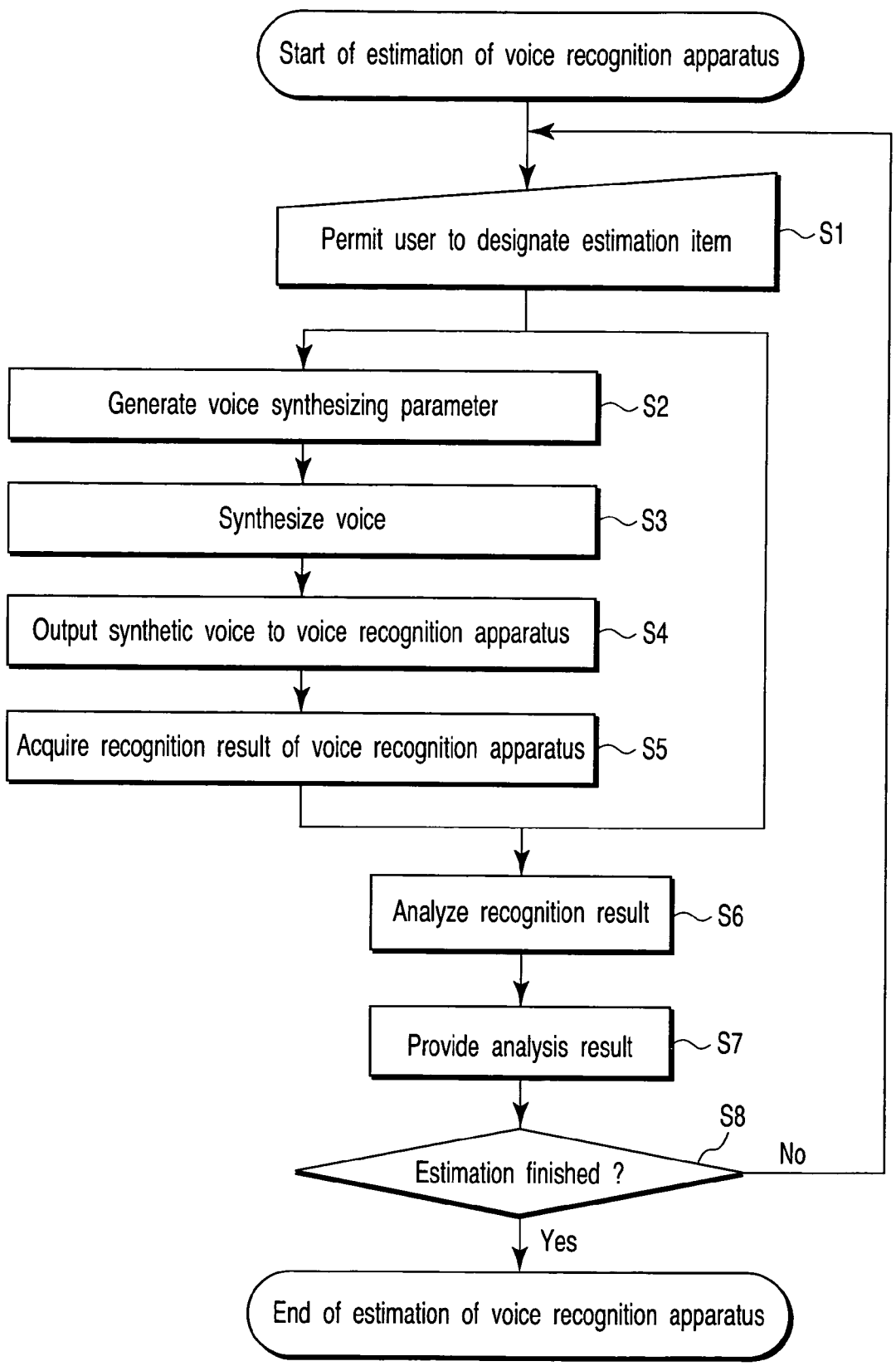
FIG. 2 is a flowchart useful in explaining a voice recognition estimation method according to the first embodiment of the invention.

Referring to FIG. 2, the operation of the voice recognition estimating apparatus of FIG. 1 will be described. FIG. 2 is a flowchart illustrating a voice recognition estimating method employed in the first embodiment.

Firstly, the estimation item-setting unit 11 permits a user to designate estimation items. The unit 11 outputs properties of estimation voice data to the voice synthesizing-parameter generator 12. From the properties of estimation voice data, the voice synthesizing-parameter generator 12 generates voice synthesizing parameters, and outputs them to the voice synthesizer 13. The voice synthesizer 13 generates synthetic voice data as estimation voice data from the voice synthesizing parameters, and outputs the voice data to the synthetic voice output unit 14. The synthetic voice output unit 14, in turn, outputs the voice data to the voice recognition apparatus to make it recognize the voice data. The recognition results of the voice recognition apparatus are acquired by the recognition result acquisition unit 15 and transferred to the recognition result analyzer 16, where they are analyzed. Specifically, referring to the estimation items obtained at a step S1 and the recognition results, the analyzer 16 analyzes the performance of the voice recognition apparatus with respect to the estimation items. Thereafter, the analysis result-providing unit 17 provides a user with the analysis results of the analyzer 16. After providing the analysis results, it is determined whether the user would like to estimate the performance of the voice recognition apparatus again. If it is determined that the user would like to estimate the performance of the apparatus again, the program returns to the step S1, whereby the performance of the apparatus is estimated again concerning, for example, other estimation items. If it is determined that no further estimation is performed, the estimation process is finished.

Figure 3:
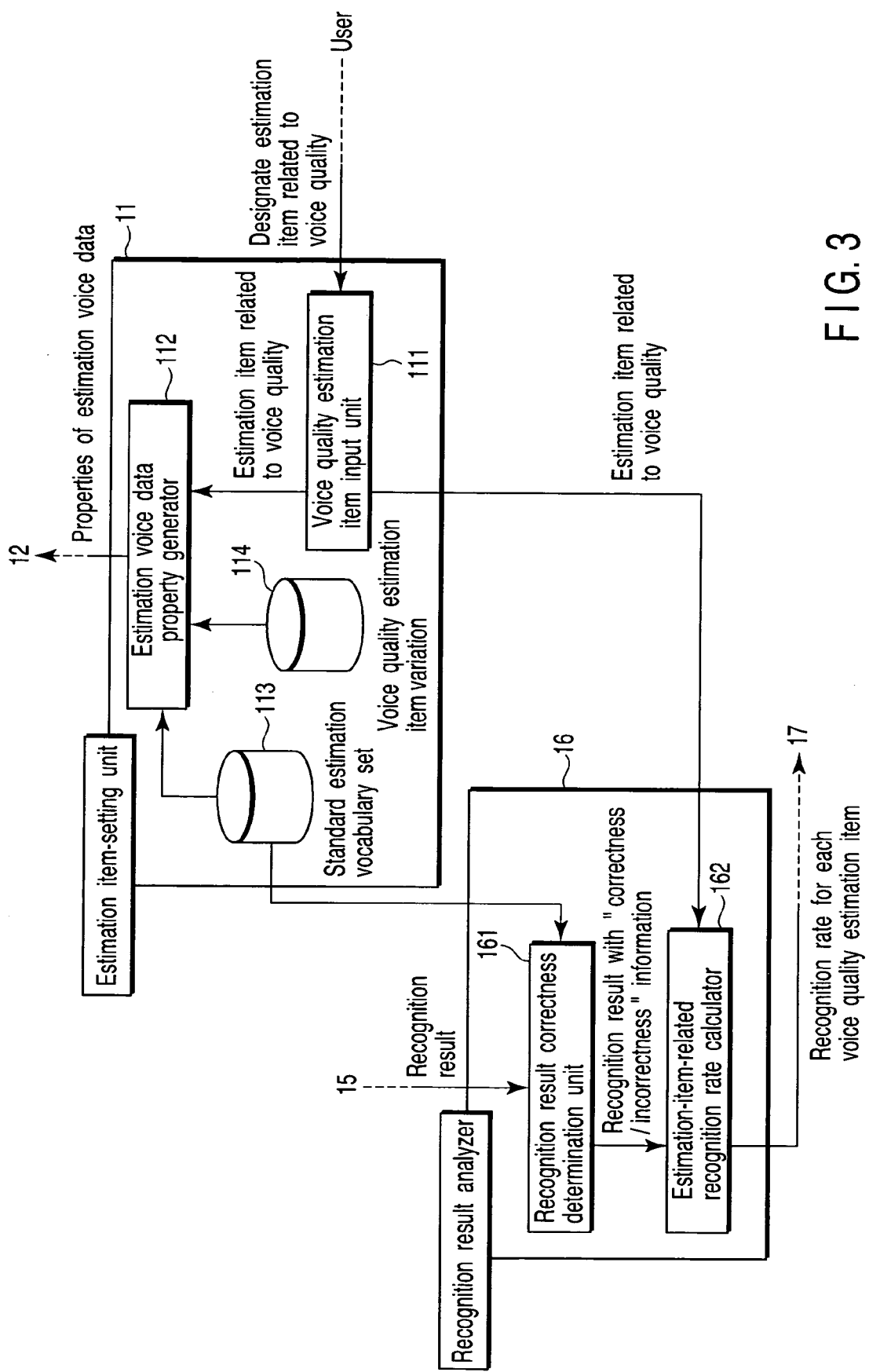
FIG. 3 is a block diagram illustrating the estimation item setting unit and recognition result analyzing unit shown in FIG. 1.

Referring now to FIG. 3, the estimation item-setting unit 11 and recognition result analyzer 16 shown in FIG. 1 will be described in detail. FIG. 3 is a block diagram showing the estimation item-setting unit 11 and the recognition result analyzer 16.

The estimation item-setting unit 11 comprises a voice quality estimation item input unit 111, estimation voice data property generator 112, standard estimation vocabulary set 113 and voice quality estimation item variation 114.

The voice quality estimation item input unit 111 receives estimation items, related to voice quality, designated by a user, and outputs them to the estimation voice data property generator 112.

Concerning the received voice quality estimation items, the estimation voice data property generator 112 refers to the voice quality estimation item variation 114 that stores variations in each estimation item, thereby generating properties of estimation voice data with variations in each estimation item. The estimation voice data property generator 112 also refers to the standard estimation vocabulary set 113, thereby generating words (content) corresponding to the properties of estimation voice data, based on the vocabulary stored in the vocabulary set 113. The estimation voice data property generator 112 supplies the voice synthesizing-parameter generator 12 with properties of estimation voice data including certain quality of voice data and the words corresponding to the properties of estimation voice data.

The standard estimation vocabulary set 113 stores a plurality of words for estimating the voice recognition apparatus. It is desirable that the stored words be standard ones expected to be often input to the voice recognition apparatus. The voice quality estimation item variation 114 stores a plurality of variations for each estimation item. The contents of the voice quality estimation item variation 114 will be described later with reference to FIGS. 4A, 4B, 4C and 4D.

The recognition result analyzer 16 includes a recognition result correctness-determination unit 161 and estimation-item-related recognition rate calculator 162.

The recognition result correctness-determination unit 161 receives the words corresponding to the properties of estimation voice data and input from the standard estimation vocabulary set 113 of the estimation item-setting unit 11 to the voice recognition apparatus. Further, the recognition result correctness-determination unit 161 compares the words with the recognition results acquired by the recognition result acquisition unit 15, determines whether the recognition results are correct, attaches, to the recognition results, information indicating whether they are correct, and outputs the recognition results with the correctness or incorrectness information to the estimation-item-related recognition rate calculator 162.

The estimation-item-related recognition rate calculator 162 refers to the estimation item information, related to voice quality, output from the voice quality estimation item input unit 111, thereby acquiring the recognition rate of each variation of each estimation item from the recognition results with the correctness or incorrectness information, and the average and dispersion in recognition rate. In the first embodiment, the estimation-item-related recognition rate calculator 162 computes the recognition rate of each variation of each of estimation items—"Sex of Speaker", "Speech Speed" and "Voice Tone", and the average and dispersion in recognition rate. However, particulars concerning the recognition rate will be described later with reference to FIG. 6. The estimation-item-related recognition rate calculator 162 outputs the recognition rate and the average and dispersion in recognition rate to the analysis result-providing unit 17.

Referring to FIGS. 4A, 4B, 4C and 4D, the contents of the voice quality estimation item variation 114 shown in FIG. 3 will be described. FIGS. 4A, 4B, 4C and 4D show the information stored in the voice quality estimation item variation 114. The voice quality estimation item variation 114 is incorporated in the estimation item-setting unit 11 and used to store information on the variations of the estimation items beforehand prepared.

In the example of FIG. 4A, estimation item 1141 "Sex of Speaker" ("Speaker (Sex)" in FIG. 4A) includes six variations. Similarly, estimation item 1142 "Speech Speed" includes five variations in FIG. 4B, and estimation item 1143 "Voice Tone" includes five variations in FIG. 4C. Concerning any estimation item other than the above-mentioned three estimation items, the most standard one is selected from the variations and used. In FIG. 4D, since estimation item 1144 "Intonation" includes three variations, only one variation "Average" is selected and used. Further, concerning a vocabulary set (hereinafter referred to as an estimation item "Grammar") that can be accepted by the voice recognition apparatus, standard "Grammar" prestored in the standard estimation vocabulary set 113 is utilized. As a result, if a user designates, as estimation items, "Speaker (Sex)", "Speech Speed" and "Voice Tone", properties of estimation voice data having 150 (=6×5×5) variations can be utilized. The estimation item-setting unit 11 supplies the voice synthesizing-parameter generator 12 with information on the estimation items designated by the user.

Referring to FIGS. 5A, 5B, 5C and 5D, a description will be given of the voice synthesizing parameters generated by the voice synthesizing-parameter generator 12 from the properties of estimation voice data that is generated by the estimation voice data property generator 112 from the variations shown in FIGS. 4A, 4B, 4C and 4D. FIGS. 5A, 5B, 5C and 5D show voice synthesizing parameters generated by the voice synthesizing-parameter generator 12 for the variations of FIGS. 4A, 4B, 4C and 4D.

In the example of FIG. 5A, voice synthesizing parameter "Model" corresponds to the estimation item "Speaker (Sex)", and "Model A" to "Model F" as the set values of the voice synthesizing parameter "Model" are generated for the variations "Man A" to "Woman F" of the estimation item "Speaker (Sex)", respectively.

Voice synthesizing parameter "Duration (in this case, an average duration for one phoneme)" corresponds to the estimation item "Speech Speed" in FIG. 5B, and "0.50" to "2.00" as the set values of the voice synthesizing parameter "Duration" are generated for the variations of the estimation item "Speech Speed". These set values indicate the rates of the variations with respect to the average duration. The lower the set value, the shorter the duration of one phoneme, i.e., the higher the speech speed.

Voice synthesizing parameter "Pitch" corresponds to the estimation item "Voice Tone" in FIG. 5C, and "2.00" to "0.05" as the set values of the voice synthesizing parameter "Pitch" are generated for the variations of the estimation item "Voice Tone". These set values indicate the rates of the variations with respect to the average pitch. The higher the set value, the greater the pitch, i.e., the higher the voice tone.

Concerning the parameters other than the above-mentioned three parameters, only one set value corresponding to a standard one of the variations of each estimation item is prepared and used. In the example of FIG. 5, for "Average" as one variation of the estimation item "Intonation" in FIG. 5D, one set value "Average Intonation Pattern" of voice synthesizing parameter "Intonation Pattern" is generated. The same can be said of other estimation items and voice synthesizing parameters. There is a case where the voice synthesizer 13 does not have high synthesis accuracy and cannot reproduce a variation of an estimation item that has a low set value. To prevent the minimum set value of variations from being limited by the performance of the voice synthesizer 13, the set value range of each voice synthesizing parameter may be dynamically varied.

Thus, 150 voice synthesizing parameter sets, needed for synthesizing 150 estimation voice data items by combining the variations of the voice synthesizing parameters "Model", "Duration" and "Pitch" designated by a user, are generated by combining the set values of the voice synthesizing parameters "Model", "Duration" and "Pitch" and the standard set values of other voice synthesizing parameters. The voice synthesizing-parameter generator 12 outputs the generated voice synthesizing parameter sets to the voice synthesizer 13.

Referring to FIG. 6, a description will be given of analysis results acquired by the recognition result analyzer 16 and provided by the analysis result-providing unit 17. The analysis results correspond to recognition results obtained by supplying the voice recognition apparatus with the synthetic voice data generated using the parameters that are generated by the voice synthesizing-parameter generator 12 of FIGS. 5A, 5B, 5C and 5D. FIG. 6 shows analysis results obtained by analysis performed using the parameters shown in FIGS. 5A, 5B, 5C and 5D.

In the example of FIG. 6, a user is provided with the recognition rates of the variations of the estimation items "Speaker (Sex)", "Speech Speed" and "Voice Tone", and the average and dispersion of the recognition rates. The provision of analysis results in the form as shown in FIG. 6 enables the user to easily understand the following: Concerning "Speaker (Sex)", since the recognition rate of man C is lower than the others, it is understood that the voice recognition apparatus does not exhibit sufficient performance for a particular speaker. Concerning "Speech Speed", since the range of dispersion of the recognition rates of the variations is wider than in the other estimation items, and the recognition rate is increased as the speech speed is lowered, it is understood that the performance of the voice recognition apparatus is greatly influenced by variations in speech speed. That is, the lower the speech speed (the speaker speaks slowly), the better the performance. Concerning "Voice Tone", since the range of dispersion of the recognition rates of the variations is very smaller than in the other estimation items, it is understood that the performance of the voice recognition apparatus is little influenced by the voice tone. The average performance of the voice recognition apparatus is understood from the average of the recognition rates.

As described above, the voice recognition estimating apparatus of the first embodiment entails little time and expense for preparing an estimation voice data set. Further, the performance of the voice recognition apparatus concerning each estimation item can be detected easily.

Second Embodiment

Figure 7:
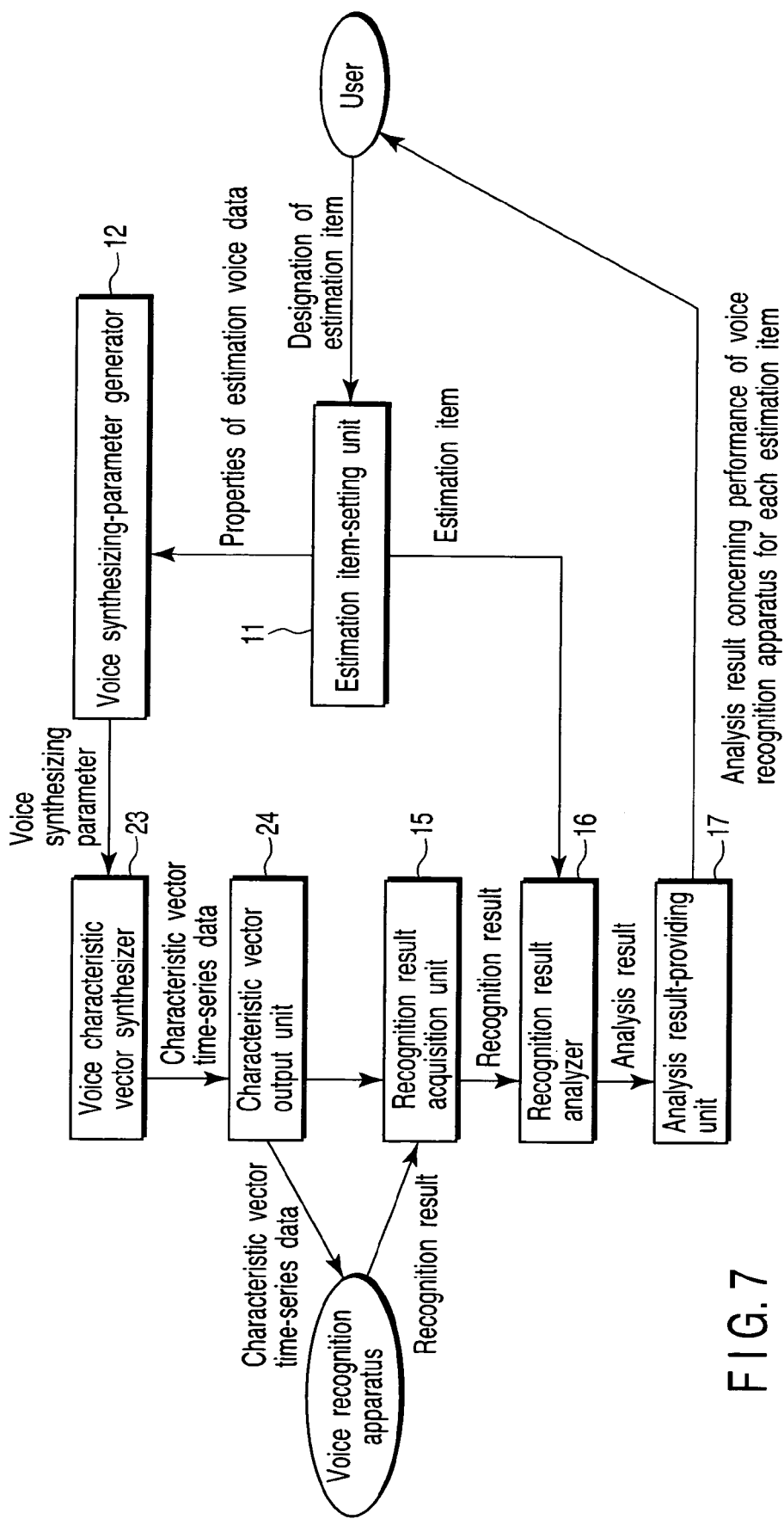
FIG. 7 is a block diagram illustrating a voice recognition apparatus according to a second embodiment of the invention.

A voice recognition estimating apparatus according to a second embodiment differs from the apparatus of the first embodiment only in that the former further employs a voice characteristic vector synthesizer 23 and characteristic vector output unit 24. FIG. 7 is a block diagram illustrating the voice recognition estimating apparatus of the second embodiment.

In the voice recognition estimating apparatus of the second embodiment, the voice characteristic vector synthesizer 23 outputs, instead of synthetic voice, characteristic vector time-series data that can be input to a to-be-estimated voice recognition apparatus. The characteristic vector time-series data is, for example, LPC cepstrum (characteristic amount). Concerning LPC cepstrum, see, for example, "Voice Data Processing" by Furui, published by Morikita Publishers Co., Ltd. The voice characteristic vector synthesizer 23 outputs the characteristic vector time-series data to the characteristic vector output unit 24. The characteristic vector output unit 24 outputs the input characteristic vector time-series data to the voice recognition apparatus, which, in turn, performs voice recognition processing with reference to the input characteristic vector time-series data.

The voice recognition estimating apparatus of the second embodiment is characterized in that the voice characteristic vector synthesizer 23 and characteristic vector output unit 24 outputs, instead of synthetic voice, characteristic vector time-series data that can be input to a to-be-estimated voice recognition apparatus. In general, the characteristic vector time-series data that can be input to a to-be-estimated voice recognition apparatus may well have a smaller data size than synthetic voice data. Accordingly, the time needed for transferring data between the voice recognition estimating apparatus and to-be-estimated voice recognition apparatus can be shortened if the characteristic vector time-series data is used instead of synthetic voice data.

Third Embodiment

A voice recognition estimating apparatus according to a third embodiment differs from the first and second embodiments in that the former employs "Grammar" as an estimation item designated by a user. In this embodiment, the user designates estimation item "Grammar" to estimate a to-be-estimated voice recognition apparatus. Since thus, the designated estimation item differs from those of the first embodiment, the third embodiment differs from the first embodiment only in the estimation item-setting unit and recognition result analyzer. The other structural elements are similar between the first and third embodiments. FIG. 8 is a block diagram illustrating the voice recognition estimating apparatus of the third embodiment.

An estimation item-setting unit 31 permits a user to designate the estimation item "Grammar that can be input to a voice recognition apparatus". In this case, assume that the estimation item "Grammar" is formed of two words—"Power-on" and "Power-off". The estimation item-setting unit 31 automatically selects all variations of the estimation items other than the estimation item "Grammar" and outputs information on the selected variations to the voice synthesizing parameter generator 12.

A recognition result analyzer 36 determines whether each recognition result input thereto is correct or incorrect, and sequentially stores the determination results. The recognition result analyzer 36 analyzes for which a certain one of the words included in the estimation item "Grammar" designated by the estimation item-setting unit 31 is mistaken. The analyzer 36 outputs the analysis result to the analysis result-providing unit 17.

Figure 9:
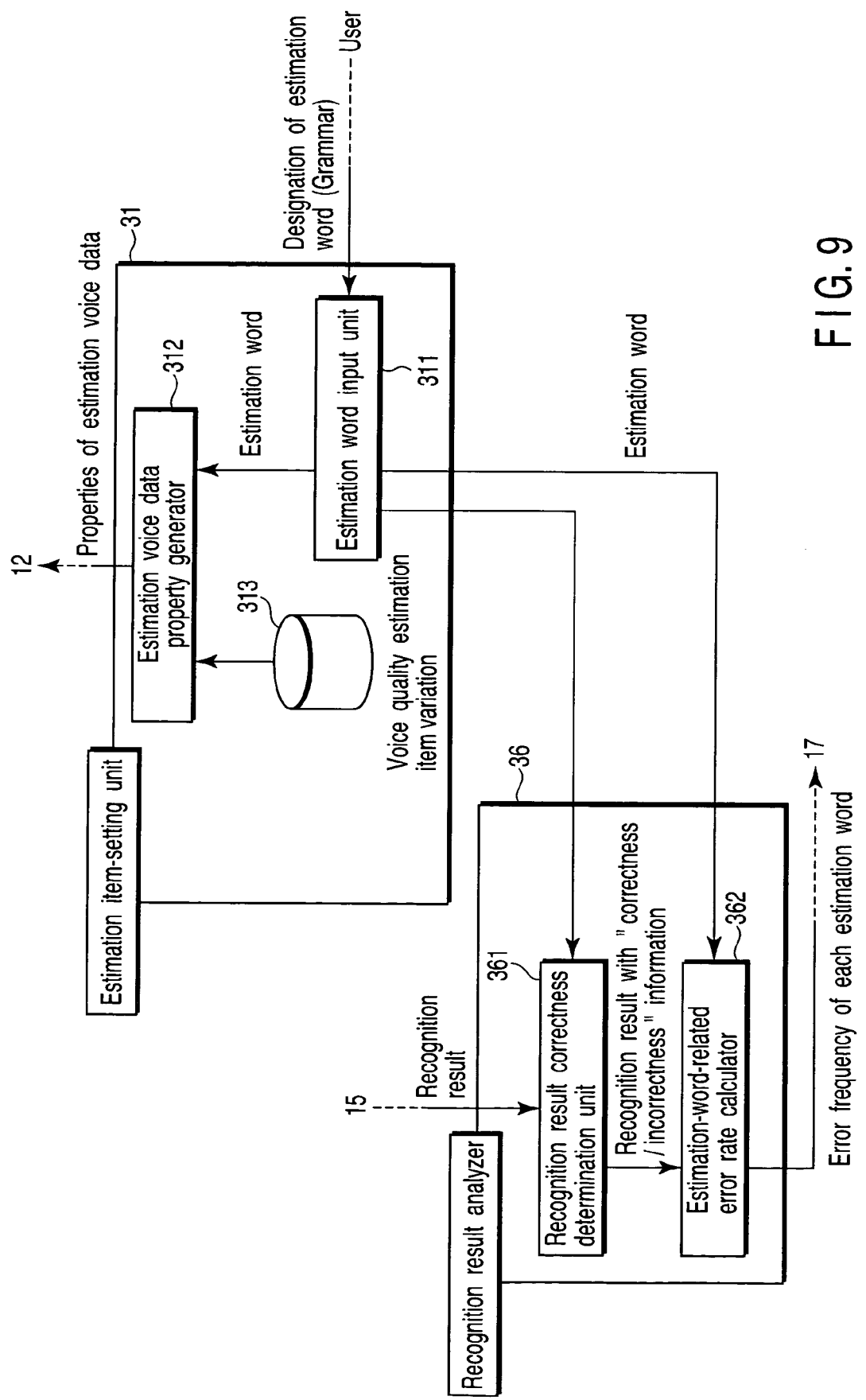
FIG. 9 is the estimation item-setting unit and recognition result-analyzing unit shown in FIG. 8.

Referring to FIG. 9, the estimation item-setting unit 31 and recognition result analyzer 36 will be described in more detail. FIG. 9 is a block diagram illustrating the estimation item-setting unit 31 and recognition result analyzer 36 shown in FIG. 8.

The estimation item-setting unit 31 comprises an estimation word input unit 311, estimation voice data property generator 312 and voice quality estimation item variation 313.

The estimation word input unit 311 permits a user to designate the estimation item "Grammar", and outputs the estimation item "Grammar" to the estimation voice data property generator 312.

The estimation voice data property generator 312 refers, for the estimation item supplied from the estimation word input unit 311, to the voice quality estimation item variation 313 that stores variation information for each voice quality estimation item, thereby generating properties of estimation voice data having variations of all estimation items.

The voice quality estimation item variation 313 stores a plurality of variations in units of estimation items. The contents of the voice quality estimation item variation 313 are similar to those shown in FIGS. 4A, 4B, 4C and 4D.

The recognition result analyzer 36 comprises a recognition result correctness-determination unit 361 and estimation-word-related error rate calculator 362.

The recognition result correctness-determination unit 361 receives each estimation word from the estimation word input unit 311 of the estimation item-setting unit 31, compares it with the recognition result acquired by the recognition result acquisition unit 15, and determines whether the recognition result is correct. Subsequently, the unit 361 attaches, to the recognition result, information indicating whether it is correct, and outputs the recognition result with the information to the estimation-word-related error rate calculator 362.

The estimation-word-related error rate calculator 362 refers to the information on the estimation words output from the estimation word input unit 311, thereby acquiring the error frequency of each variation of each estimation item from the recognition results with the correctness or incorrectness information. This will be described later in more detail with reference to FIG. 10. After that, the calculator 362 outputs the error frequency to the analysis result-providing unit 17.

The third embodiment will be described in more detail, using the estimation item "Grammar", formed of two words "Power-on" and "Power-off", as the estimation item "Grammar" that can be accepted by the voice recognition apparatus.

Firstly, the user selects the estimation item "Grammar that can be input to a voice recognition apparatus" from the estimation items provided by the estimation item-setting unit 31, and inputs words (Grammar) for estimating the performance of the voice recognition apparatus, to the estimation word input unit 311.

For the "Grammar" designated by the estimation word input unit 311, the estimation voice data property generator 312 refers to the voice quality estimation item variation 313 that stores variation information for each voice quality estimation item, thereby generating properties of estimation voice data having variations of all estimation items stored in the voice quality estimation item variation 313. More specifically, for each word included in the estimation item "Grammar", properties of estimation voice data is generated, which has all variations of the estimation items—"Speaker (Sex)", "Speech speed", "Voice Tone" and "Intonation"—stored in the variation 313.

The estimation item-setting unit 31 outputs the generated properties of estimation voice data to the voice synthesizing-parameter generator 12. The voice synthesizing-parameter generator 12 generates a voice synthesizing parameter corresponding to the variations of each estimation item.

The voice synthesizing-parameter generator 12 generates a voice synthesizing parameter corresponding to the variation of each of the input estimation items other than "Grammar", using the same method as described in the first embodiment. After that, the voice synthesizing-parameter generator 12 supplies the voice synthesizer 13 with the generated voice synthesizing parameter set and the estimation item "Grammar" input by the user.

The voice synthesizer 13 performs voice synthesis processing based on the input voice synthesizing parameters. At this time, the synthesizer 13 synthesizes voice data corresponding to all words included in the estimation item "Grammar" input by the user to the estimation item-setting unit 31. In the present example, voice data corresponding to each of the two words, "Power-on" and "Power-off", is synthesized for each combination of all parameter set values. The voice synthesizer 13 outputs the synthetic voice data to the synthetic voice output unit 14.

The synthetic voice output unit 14 outputs synthetic voice data to the to-be-estimated voice recognition apparatus. The voice recognition apparatus performs recognition processing on the input synthetic voice data. The recognition result acquisition unit 15 acquires a recognition result from the voice recognition apparatus and outputs it to the recognition result analyzer 36.

The recognition result analyzer 36 determines whether each input recognition result is correct, and sequentially stores the determination results. The recognition result analyzer 36 analyzes for which a certain one of the words included in the estimation item "Grammar" designated by the estimation item-setting unit 31 is mistaken. The analyzer 36 outputs the analysis result to the analysis result-providing unit 17.

In the third embodiment, concerning the words "Power-on" and "Power-off" included in the item "Grammar", the frequency at which the former is mistaken for the latter or vice versa, as is shown in the upper table of FIG. 10, is acquired. FIG. 10 shows the analysis results obtained by the estimation-word-related error rate calculator 362 and provided to a user by the analysis result-providing unit 17.

The analysis result-providing unit 17 provides the input analysis result in a form that enables the user to easily understand the result, as is shown in, for example, the upper table of FIG. 10. The upper table of FIG. 10 illustrates for which and how often each of the words included in the estimation item "Grammar" designated by the estimation item-setting unit 31 is mistaken. The frequency of erroneous recognition is the rate of the number of occasions of erroneous recognition to the total occasions of utterance of each word. Since the analysis results are provided to the user in the form as shown in FIG. 10, they can easily understand for which and how often each word is liable to be mistaken. From the upper table of FIG. 10, for example, it can be easily understood that there is a strong tendency for "Power-off" to be mistaken for "Power-on", but there is no opposite tendency.

The user can repeat the above-described processing with the estimation item "Grammar" changed based on the analysis results provided by the analysis result-providing unit 17, and the other conditions unchanged. For instance, the lower table of FIG. 10 illustrates the outputs of the analysis result-providing unit 17 when the above-described processing is repeated with the contents of the estimation item "Grammar" changed to two vocabulary components "Turn on Power" and "Turn off Power". In the lower table of FIG. 10, there is no particular recognition bias, i.e., all vocabulary components are erroneously recognized at the same rate of erroneous recognition, which differs from the upper table of FIG. 10. Thus, by comparing the upper and lower tables of FIG. 10, the user can easily find that the vocabulary components of "Grammar" shown in the lower table are free from a certain bias of recognition.

Thus, as shown in FIG. 10, the difference in tendency of erroneous recognition between two vocabulary sets of "Grammar" can be easily detected by outputting analysis results concerning the performance of the voice recognition apparatus, using the two different vocabulary sets of "Grammar", and comparing the analysis results. In the examples of FIG. 10, it is easily understood that the bias of erroneous recognition rates is smaller using two vocabulary components "Turn on Power" and "Turn off Power" than using two words "Power-on" and "Power-off".

Using the voice recognition estimating apparatus of the third embodiment, the user can easily determine whether there is a particular bias of recognition of "Grammar" that can be accepted by the voice recognition apparatus. Further, the recognition results of the voice recognition apparatus concerning a plurality of vocabulary sets of "Grammar" can be easily compared.

Fourth Embodiment

Figure 11:
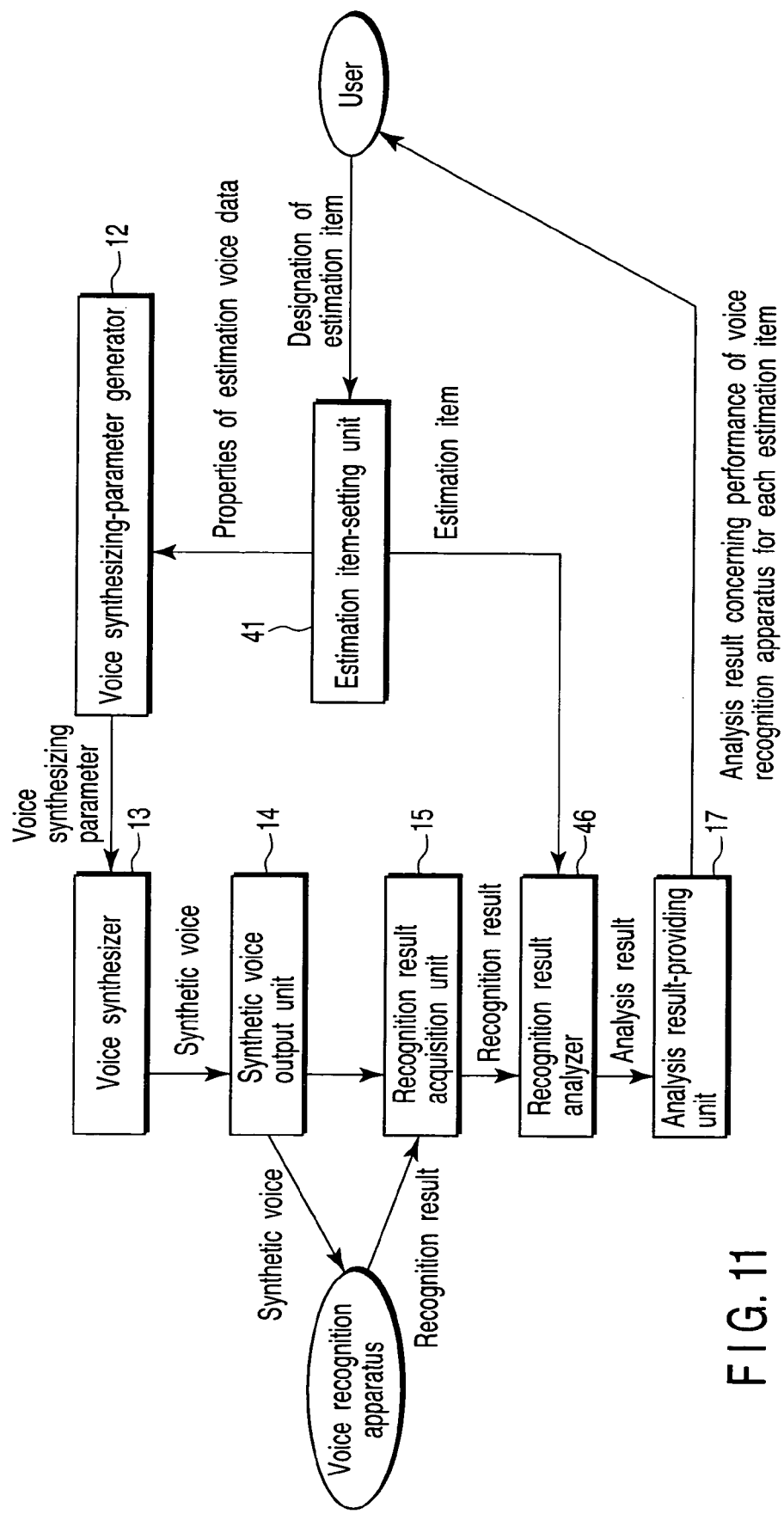
FIG. 11 is a block diagram illustrating a voice recognition apparatus according to a fourth embodiment of the invention.

A voice recognition estimating apparatus according to a fourth embodiment differs from the other embodiments in estimation item designated by a user. In this embodiment, the user can determine whether or not the estimation data set should contain a hesitation pause, hesitation voice or unnecessary word that may occur in actual utterance. Since thus, the designated estimation item differs from those of the first embodiment, the fourth embodiment differs from the first embodiment only in the estimation item-setting unit and recognition result analyzer. The other structural elements are similar between the first and third embodiments. FIG. 11 is a block diagram illustrating the voice recognition estimating apparatus of the fourth embodiment.

In the fourth embodiment, an estimation item-setting unit 41 accepts, as an estimation item for the voice recognition apparatus, insertion of a hesitation pause, hesitation voice or unnecessary word in actual utterance. Furthermore, the user can designate a to-be-inserted hesitation pause, hesitation voice or unnecessary word, and the insertion position thereof. For example, a hesitation pause can be inserted immediately before "Turn on", or an unnecessary word, such as "Well . . . " be inserted between "Turn off" and "Power". If the position in which a hesitation pause, hesitation voice or unnecessary word is inserted is not designated, an appropriate one is selected from a hesitation/unnecessary word list prestored in the estimation item-setting unit 41 and inserted in an arbitrary position in "Grammar". In this case, the insertion position or to-be-inserted content may be determined at random. Alternatively, totalistic information on the positions in "Grammar", in which a hesitation pause, hesitation voice or unnecessary word is liable to be inserted, or on to-be-inserted contents may be prestored and referred to when determining the insertion position or content.

A recognition result synthesizer 46 determines whether each input recognition result is correct, and sequentially stores the determination results. The recognition result analyzer 46 analyzes for which a certain one of the words included in the estimation item "Grammar" designated by the estimation item-setting unit 41 is mistaken. The analyzer 46 outputs the analysis result to the analysis result-providing unit 17.

Figure 12:
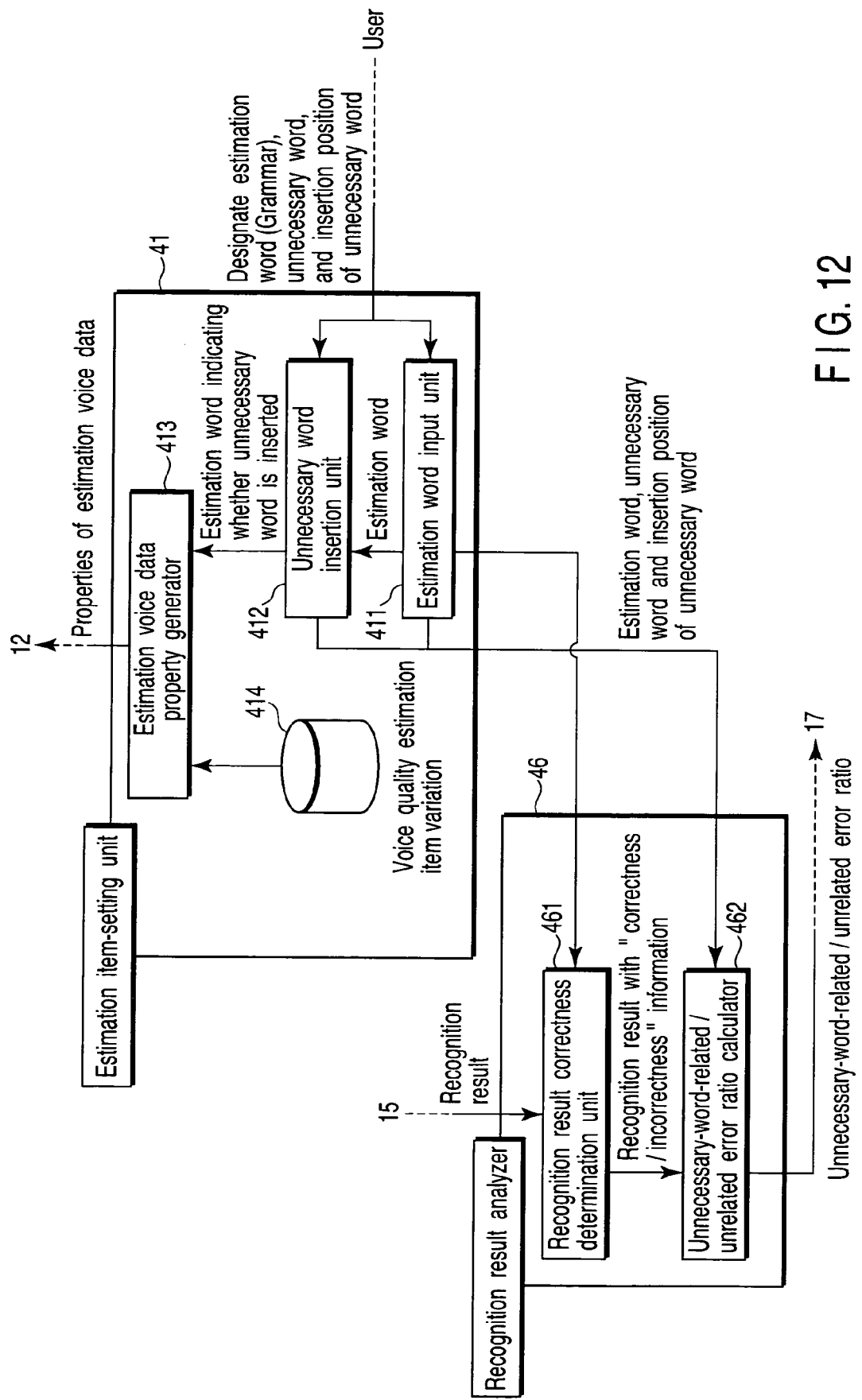
FIG. 12 is the estimation item-setting unit and recognition result-analyzing unit shown in FIG. 11.

Referring to FIG. 12, the estimation item-setting unit 41 and recognition result analyzer 46 will be described in detail. FIG. 12 is a block diagram illustrating the estimation item-setting unit 41 and recognition result analyzer 46 shown in FIG. 11.

The estimation item-setting unit 41 comprises an estimation word input unit 411, unnecessary word insertion unit 412, estimation voice data property generator 413 and voice quality estimation item variation 414.

The estimation word input unit 411 permits a user to designate an estimation item "Grammar" that can be accepted by the voice recognition apparatus. The unnecessary word insertion unit 412 generates a "Grammar" item having an unnecessary word inserted therein, and another "Grammar" item having no insertion. These "Grammar" items are output as estimation words to the estimation voice data property generator 413. The unnecessary word insertion unit 412 designates an unnecessary word, such as "Well", or a hesitation pause that is not included in "Grammar" but appears in actual utterance, and the position of the unnecessary word, hesitation voice or hesitation pause in "Grammar".

The estimation voice data property generator 413 refers, for the estimation items supplied from the unnecessary word insertion unit 412, to the voice quality estimation item variation 414 that stores variation information for each voice quality estimation item, thereby generating properties of estimation voice data having variations of all estimation items.

The voice quality estimation item variation 414 stores a plurality of variations in units of estimation items. The contents of the voice quality estimation item variation 414 are similar to those of the variation 313 of the third embodiment.

The recognition result analyzer 46 comprises a recognition result correctness-determination unit 461 and unnecessary-word-related/unrelated error rate calculator 462.

The recognition result correctness-determination unit 461 receives each estimation word from the estimation word input unit 411 of the estimation item-setting unit 41, compares it with the recognition result acquired by the recognition result acquisition unit 15, and determines whether the recognition result is correct. Subsequently, the unit 461 attaches, to the recognition result, information indicating whether it is correct, and outputs the recognition result with the information to the unnecessary-word-related/unrelated error rate calculator 462.

The unnecessary-word-related/unrelated error rate calculator 462 refers to the information, concerning the estimation words, unnecessary word and insertion position of the unnecessary word, output from the estimation word input unit 411 and unnecessary word insertion unit 412, thereby acquiring the error frequency of each variation of each estimation item from the recognition results with the correctness or incorrectness information. This will be described later in more detail with reference to FIG. 13. After that, the calculator 462 outputs the error frequency to the analysis result-providing unit 17.

The entire operation of the fourth embodiment will be described.

The estimation item-setting unit 41 supplies the voice synthesizing-parameter generator 12 with the estimation items and Grammar designated by a user, and information on a to-be-inserted hesitation pause, hesitation voice or unnecessary word and the insertion position thereof. The voice synthesizing-parameter generator 12 generates a voice synthesizing parameter corresponding to the variations of each estimation item. The voice synthesizing-parameter generator 12 supplies the voice synthesizer 13 with the generated voice synthesizing parameter set, the estimation item "Grammar", to-be-inserted hesitation pause, hesitation voice or unnecessary word, and the insertion position thereof.

The voice synthesizer 13 performs voice synthesis processing based on the input voice synthesizing parameters. At this time, the synthesizer 13 synthesizes voice data corresponding to all words included in the estimation item "Grammar" input by the user, with the hesitation pause, hesitation voice or unnecessary word inserted in a to-be-inserted position. Thus, the user can easily obtain an estimation voice data set having the hesitation or unnecessary word inserted. The voice synthesizer 13 outputs the synthetic voice data to the synthetic voice output unit 14.

The synthetic voice output unit 14, recognition result acquisition unit 15 and analysis result-providing unit 17 operate in the same manners as in the first and third embodiments. Concerning the estimation items designated by a user through the estimation item-setting unit 41, they operate in the same manner as in the first embodiment. Further, concerning the estimation item "Grammar", they operate in the same manner as in the third embodiment.

Furthermore, in the fourth embodiment, the recognition result analyzer 46 analyzes the detection function of the voice recognition apparatus concerning whether or not a hesitation pause, hesitation voice or unnecessary word is inserted, and the analysis result-providing unit 17 provides a user with the analysis result in a form that enables them to easily understand the result. FIG. 13 shows an example of the form. Specifically, FIG. 13 illustrates recognition rates obtained by the unnecessary-word-related/unrelated error rate calculator 462 when an unnecessary word is inserted and not inserted. From the analysis-result-providing form shown in FIG. 13, the user can easily know variations in the performance of the voice recognition apparatus that depend upon whether or not a hesitation pause, hesitation voice or unnecessary word is inserted. In the example of FIG. 13, it is understood that if a hesitation pause, hesitation voice or unnecessary word is inserted, the performance of the voice recognition apparatus is significantly degraded.

In general, it is difficult for a person to intentionally insert a hesitation pause, hesitation voice or unnecessary word. On the other hand, the voice recognition estimating apparatus of the fourth embodiment can provide, at little time and expense, an estimation voice data set with hesitation pauses or unnecessary words inserted therein. In addition, the voice recognition estimating apparatus of the fourth embodiment enables a user to easily estimate the performance of a voice recognition apparatus concerning estimation voice data in which a hesitation pause, hesitation voice or unnecessary word is inserted.

Fifth Embodiment

Figure 14:
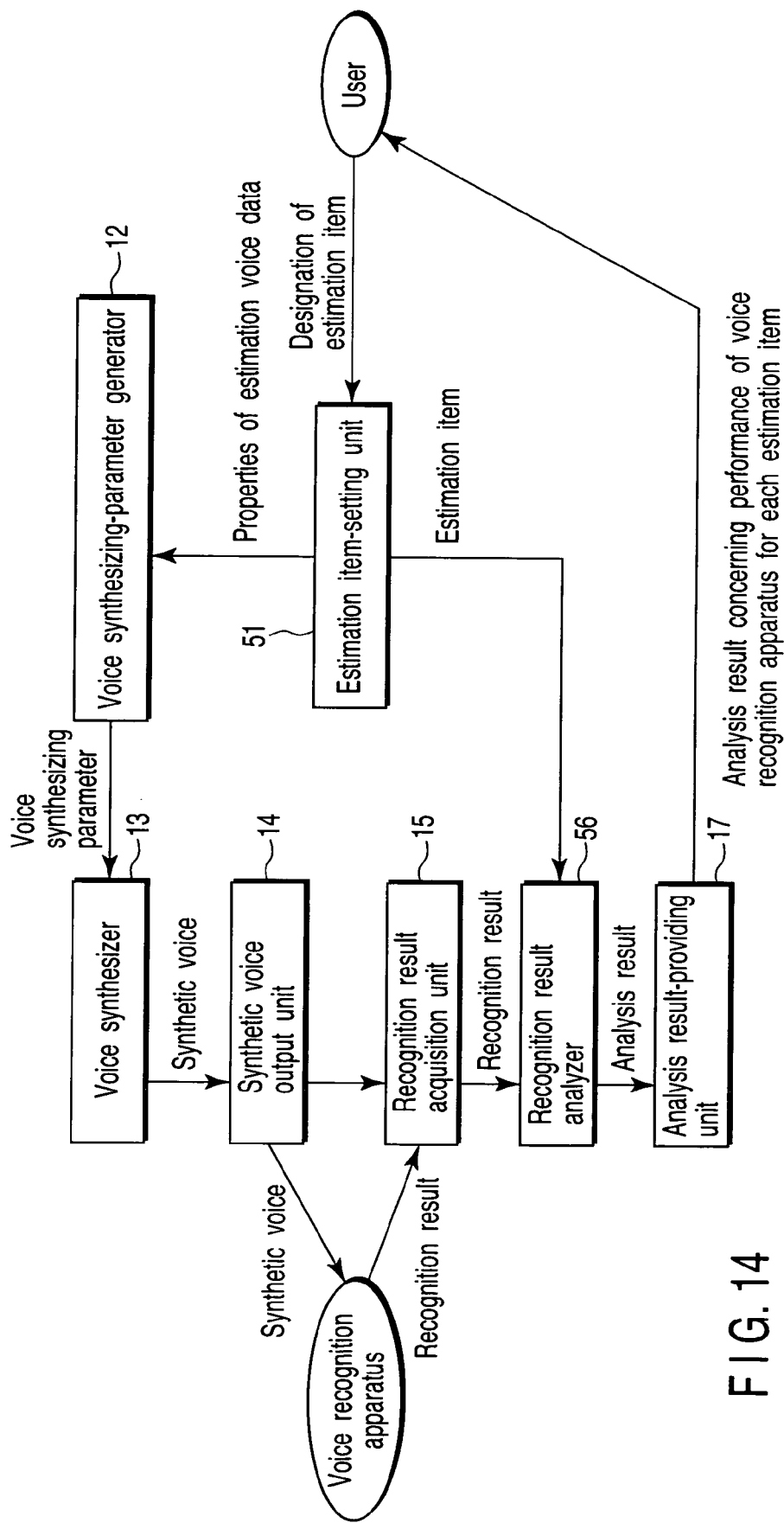
FIG. 14 is a block diagram illustrating a voice recognition apparatus according to a fifth embodiment of the invention.

The fourth embodiment differs from the other embodiments in the estimation item designed by a user. In a fifth embodiment, the user can determine whether the emotion with which original voice data is charged should be contained in an estimation voice data set. In general, it is expected that the voice tone of a person depends upon their emotion. The fifth embodiment provides a voice recognition estimation apparatus for estimating the performance of a voice recognition apparatus concerning voice data varying in accordance with emotion. Since thus, the designated estimation item differs from those of the first embodiment, the fifth embodiment differs from the first embodiment only in the estimation item-setting unit and recognition result analyzer. The other structural elements are similar between the first and third embodiments. FIG. 14 is a block diagram illustrating the voice recognition estimating apparatus of the fifth embodiment.

In the fifth embodiment, an estimation item-setting unit 51 accepts, as an estimation item for the voice recognition apparatus, the emotion with which original voice data is charged. A user designates the emotion with which original voice data is charged. Estimation items of emotion include, for example, "Anger", "Pleasure" and "Sorrow". The estimation item-setting unit 51 supplies the voice synthesizing-parameter generator 12 with the estimation items and Grammar designated by a user, and information as to the emotion with which original voice data is charged.

The recognition result analyzer 56 determines whether each input recognition result is correct, and sequentially stores the determination results. The recognition result analyzer 56 analyzes whether the voice data varying in accordance with the emotion designated by an emotion information input unit 511 has been recognized. The analyzer 56 outputs the analysis result to the analysis result-providing unit 17.

Figure 15:
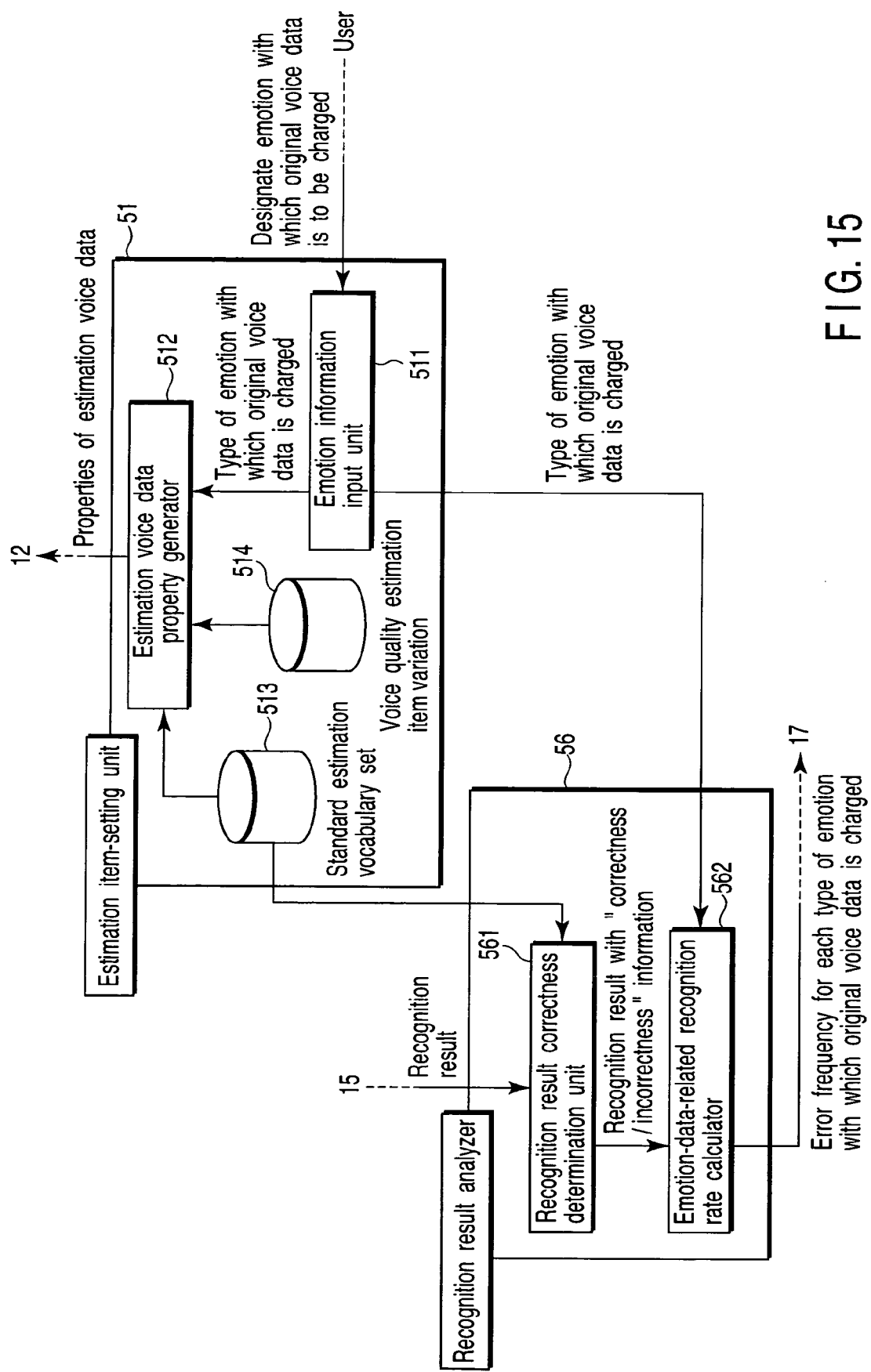
FIG. 15 is the estimation item-setting unit and recognition result-analyzing unit shown in FIG. 14.

Referring to FIG. 15, the estimation item-setting unit 51 and recognition result analyzer 56 will be described in detail. FIG. 15 is a block diagram illustrating the estimation item-setting unit 51 and recognition result analyzer 56 shown in FIG. 14.

The estimation item-setting unit 51 comprises an emotion information input unit 511, estimation voice data property generator 512, standard estimation vocabulary set 513 and voice quality estimation item variation 514.

The emotion information input unit 511 permits a user to designate the type of emotion with which original voice data is charged, and outputs the type to the estimation voice data property generator 512. Referring to the standard estimation vocabulary set 513 and voice quality estimation item variation 514, the estimation voice data property generator 512 generates estimation voice data and outputs it to the voice synthesizing-parameter generator 12. More specifically, the estimation voice data property generator 512 refers to the voice quality estimation item variation 514 for each word of "Grammar" stored in the standard estimation vocabulary set 513, thereby generating properties of estimation voice data having all variations corresponding to those stored in the voice quality estimation item variation 514. In other words, for each word of "Grammar", properties of estimation voice data is generated, which has all variations of estimation items "Speaker (Sex)", "Speech Speed", "Voice Tone" and "Intonation". Assume that the estimation voice data property generator 512 refers to the type of emotion, with which utterance is performed, output from the emotion information input unit 511, thereby generating properties of estimation voice data for each type of emotion.

The recognition result analyzer 56 comprises a recognition result correctness-determination unit 561 and emotion information-related recognition rate calculator 562.

The recognition result correctness-determination unit 561 receives the words input from the standard estimation vocabulary set 513 of the estimation item-setting unit 51 to the voice recognition apparatus. Subsequently, the recognition result correctness-determination unit 561 compares the words with the recognition results acquired by the recognition result acquisition unit 15, determines whether the recognition results are correct, attaches, to the recognition results, information indicating whether they are correct, and outputs the recognition results with the correctness or incorrectness information to the emotion information-related recognition rate calculator 562.

The emotion information-related recognition rate calculator 562 refers to the type of emotion, with which original voice data is charged, output from the emotion information input unit 511, and calculates, from the recognition results with the correctness or incorrectness information, the recognition rate of voice data having varied in accordance with each type of emotion. For example, as shown in FIG. 16, for each type of the emotion "Anger", "Pleasure" and "Sorrow", the recognition rate of voice data having varied in accordance with the emotion. After that, the emotion information-related recognition rate calculator 562 provides the analysis result-providing unit 17 with the thus-obtained recognition rate as the analysis result of the performance of the voice recognition apparatus concerning voice data varying in accordance with the type of emotion with which original voice data is charged.

The entire operation of the fifth embodiment will be described.

The estimation item-setting unit 51 supplies the voice synthesizing-parameter generator 12 with the estimation items and Grammar designated by a user, and information on the emotion with which original voice data is charged. The voice synthesizing-parameter generator 12 generates a voice synthesizing parameter corresponding to the variations of each estimation item, referring to information related to voice quality and the emotion with which original voice data is charged. When generating a voice synthesizing parameter, the voice synthesizing-parameter generator 12 adjusts, using an emotion voice synthesis technique, the parameter in accordance with the emotion designated by the estimation item-setting unit 51, and attaches to the adjusted parameter, if necessary, a parameter (emotion parameter) for designating the emotion with which the synthetic voice data is charged. The voice synthesizing-parameter generator 12 outputs the generated voice synthesizing parameter set and attached emotion parameter to the voice synthesizer 13.

The voice synthesizer 13 performs emotion-charged-voice synthesis processing based on the input voice synthesizing parameters and emotion parameters attached thereto. The voice synthesizer 13 outputs the synthesized emotion-charged-voice data to the synthetic voice output unit 14.

The synthetic voice output unit 14, recognition result acquisition unit 15 and analysis result-providing unit 17 operate in the same manners as in the first and third embodiments. Concerning the estimation items designated by a user through the estimation item-setting unit 51, they operate in the same manner as in the first embodiment. Further, concerning the estimation item "Grammar", they operate in the same manner as in the third embodiment. Furthermore, in the fifth embodiment, the recognition result analyzer 56 analyzes the performance of the voice recognition apparatus concerning voice data having varied in accordance with the emotion designated by a user. The analysis result-providing unit 17 provides a user with the analysis result in a form that enables them to easily understand the result. FIG. 16 shows an example of the form. Specifically, FIG. 16 illustrates recognition rates calculated by the emotion information-related recognition rate calculator 562. From the analysis-result-providing form shown in FIG. 16, the user can easily know variations in the performance of the voice recognition apparatus that depend upon the emotion with which original voice data is charged. In the example of FIG. 16, it is understood that the emotion with which original voice data is charged is "Sorrow", the performance of the voice recognition apparatus is significantly degraded, compared to the case where the emotion is "Anger" or "Pleasure".

In general, it is difficult for a person to intentionally charge a voice with emotion. On the other hand, the voice recognition estimating apparatus of the fifth embodiment can provide, at little time and expense, a set of estimation voice data charged with emotion. In addition, the voice recognition estimating apparatus of the fifth embodiment enables a user to easily estimate the performance of a voice recognition apparatus concerning estimation voice data charged with emotion.

As described above, the voice recognition estimating apparatus, method and program of the embodiments can solve the problem raised in the conventional estimation of voice recognition apparatuses, i.e., the problem that considerable time and expense is entailed for the preparation of an estimation voice data set. Further, the voice recognition estimating apparatus, method and program of the embodiments enable users to easily detect the performance of a voice recognition apparatus concerning each estimation item. Thus, the voice recognition estimating apparatus, method and program of the embodiments are very useful for users who try to estimate the performance of voice recognition apparatuses.

Also, in the embodiments of the invention, set values for each voice-synthesizing parameter, which are needed for outputting synthetic voice data that sufficiently covers the variations of each estimation item, are automatically generated. The voice-synthesizing unit uses these set values for generating synthetic voice data. Since the voice data is used as estimation voice data, the estimation voice data can be obtained with little time and expense.

In addition, in the embodiments of the invention, the recognition results output from the voice recognition apparatus are automatically analyzed by a totalistic method in units of estimation items designated by a user, and the user is provided with the performance of the voice recognition apparatus concerning each estimation item. Thus, the user can easily know the performance of the voice recognition apparatus concerning each estimation item simply by designating estimation items. The flow charts of the embodiments illustrate methods according to the embodiments of the invention. It will be understood that each block of the flowchart illustrations, and combinations of blocks in the flowchart illustrations, can be implemented by computer program instructions. These computer program instructions may be loaded onto a computer or other programmable apparatus to produce a machine, such that the instructions which execute on the computer or other programmable apparatus create means for implementing the functions specified in the flowchart block or blocks. These computer program instructions may also be stored in a computer-readable memory that can direct a computer or other programmable apparatus to function in a particular manner, such that the instruction stored in the computer-readable memory produce an article of manufacture including instruction means which implement the function specified in the flowchart block of blocks. The computer program instructions may also be loaded onto a computer or other programmable apparatus to cause a series of operational steps to be performed on the computer or other programmable apparatus to produce a computer programmable apparatus provide steps for implementing the functions specified in the flowchart block or blocks.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A voice recognition estimating apparatus for a voice recognition apparatus, comprising:
   a voice data property generator that generates properties of voice data used to determine, based on an estimation item, a feature of synthetic voice data, the estimation item being used to estimate a performance of the voice recognition apparatus;
   a parameter generator that generates a parameter used to generate the synthetic voice data corresponding to the properties of the voice data;
   a synthetic voice generator that generates the synthetic voice data based on the parameter;
   an output unit configured to output the synthetic voice data to the voice recognition apparatus;
   an acquisition unit configured to acquire a recognition result from the voice recognition apparatus, the recognition result being obtained when the voice recognition apparatus recognizes the synthetic voice data; and
   an estimation unit configured to estimate the performance of the voice recognition apparatus with reference to the estimation item and the recognition result,
   wherein the voice data property generator includes
      another acquisition unit configured to acquire vocabulary data and unnecessary word data as the estimation item, the vocabulary data being used to make the synthetic voice data correspond to an actual voice indicating a word, the unnecessary word data indicating an unnecessary word inserted in the vocabulary data and an insertion position of the unnecessary word;
      a voice quality storage that stores a plurality of voice quality data items;
      a selector that selects several voice quality data items of the voice quality data items from the voice quality storage in accordance with the estimation item; and
      a generator that generates the properties of the voice data, the properties of the voice data including the selected voice quality data items, the vocabulary data and the unnecessary word data.

2. The voice recognition estimating apparatus according to claim 1, wherein the estimation unit includes:
   a determination unit configured to determine whether or not the recognition result is correct, by comparing the vocabulary data corresponding to the synthetic voice data with the recognition result; and
   a calculator that calculates a rate of recognition as to whether an unnecessary word is inserted in the vocabulary data by referring to a determination result of the determination unit and the estimation item.

3. A voice recognition estimating method, comprising:
   generating properties of estimation voice data used to determine, based on an estimation item, a feature of synthetic voice data, the estimation item being used to estimate performance of a voice recognition apparatus;
   generating a parameter used to generate the synthetic voice data as estimation voice data corresponding to the properties of the estimation voice data;
   generating the synthetic voice data based on the parameter;
   outputting the synthetic voice data to the voice recognition apparatus;
   acquiring a recognition result from the voice recognition apparatus, the recognition result being obtained when the voice recognition apparatus recognizes the synthetic voice data; and
   estimating the performance of the voice recognition apparatus with reference to the estimation item and the recognition result,
   wherein the generating the properties of the estimation voice data includes
      acquiring vocabulary data and unnecessary word data as the estimation item, the vocabulary data being used to make the synthetic voice data correspond to an actual voice indicating a word, the unnecessary word data indicating an unnecessary word inserted in the vocabulary data and an insertion position of the unnecessary word;
      storing a plurality of voice quality data items;
      selecting several voice quality data items of the voice quality data items in accordance with the estimation item; and
      generating the properties of the estimation voice data, the properties of the estimation voice data including the selected voice quality data items, the vocabulary data and the unnecessary word data.

4. The voice recognition estimating method according to claim 3, wherein the estimating the performance of the voice recognition apparatus includes:
   determining whether or not the recognition result is correct, by comparing the vocabulary data corresponding to the synthetic voice data with the recognition result; and
   calculating a rate of recognition as to whether an unnecessary word is inserted in the vocabulary data by referring to a determination result as to whether the recognition result is correct and the estimation item.

5. A computer-readable medium including computer executable instructions, wherein the instructions, when executed by a processor, cause the processor to perform a voice recognition estimating method, comprising:

generating properties of estimation voice data used to determine, based on an estimation item, a feature of synthetic voice data, the estimation item being used to estimate a performance of a voice recognition apparatus;

generating a parameter used to generate the synthetic voice data as estimation voice data corresponding to the properties of the estimation voice data;

generating the synthetic voice data based on the parameter;

outputting the synthetic voice data to the voice recognition apparatus;

acquiring a recognition result from the voice recognition apparatus, the recognition result being obtained when the voice recognition apparatus recognizes the synthetic voice data; and estimating the performance of the voice recognition apparatus with reference to the estimation item and the recognition result, wherein the generating properties of the estimation voice data includes acquiring vocabulary data and unnecessary word data as the estimation item, the vocabulary data being used to make the synthetic voice data correspond to an actual voice indicating a word, the unnecessary word data indicating an unnecessary word inserted in the vocabulary data and an insertion position of the unnecessary word;

storing a plurality of voice quality data items;

selecting several voice quality data items of the voice quality data items in accordance with the estimation item; and generating the properties of the estimation voice data, the properties of the estimation voice data including the selected voice quality data items, the vocabulary data and the unnecessary word data.

6. The computer-readable medium according to claim 5, wherein the estimating the performance of the voice recognition apparatus includes:

determining whether or not the recognition result is correct, by comparing the vocabulary data corresponding to the synthetic voice data with the recognition result; and calculating a rate of recognition as to whether an unnecessary word is inserted in the vocabulary data by referring to a determination result and the estimation item.

* * * * *